United States Patent [19]

Bestler et al.

[11] Patent Number: 5,608,732
[45] Date of Patent: Mar. 4, 1997

[54] TELEVISION DISTRIBUTION SYSTEM HAVING VIRTUAL MEMORY DOWNLOADING

[75] Inventors: Caitlin B. Bestler, Chicago; Mack S. Daily, Round Lake Park, both of Ill.

[73] Assignee: Zenith Electronics Corporation, Glenview, Ill.

[21] Appl. No.: 115,288

[22] Filed: Sep. 1, 1993

[51] Int. Cl.⁶ .................................................. H04J 3/24
[52] U.S. Cl. ................................... 370/474; 348/467
[58] Field of Search .................. 370/94.1, 60, 94.2, 370/95.1, 95.2, 95.3, 124, 30, 50, 105.1, 105.2, 105.3, 118, 7, 85.2; 455/3.1; 375/222, 200, 202, 257; 348/6, 17, 14, 467, 461

[56] References Cited

U.S. PATENT DOCUMENTS

| | | | |
|---|---|---|---|
| 4,521,891 | 6/1985 | Biba et al. | 375/222 |
| 4,534,024 | 8/1985 | Maxemchuk et al. | 370/94.1 |
| 4,916,539 | 4/1990 | Galumbeck | 348/467 |
| 5,425,100 | 6/1995 | Thomas et al. | 348/467 |

*Primary Examiner*—Douglas W. Olms
*Assistant Examiner*—Dang Ton
*Attorney, Agent, or Firm*—Roland W. Norris; Roy Eckstrand

[57] ABSTRACT

A television cable system includes a headend and a decoder coupled by an in-band communication link and an out of band communication link. The headend controller includes conventional transmission systems for providing a plurality of program channels to the decoder via the in-band communication link. In addition, the headend system includes a plurality of controller inputs which provide data to a download executive circuit which in turn organizes data and transfer it to a transmitter coupled to the out of band data link. Within the decoder, a pair of processors are operative via a communication link therebetween. One processor is of predefine capability and is used to operate a user keyboard as well as conventional tuning and signal processing and descrambling systems to provide television display. The remaining processor includes a memory manager coupled to an out of band transmission receiver which receives downloaded interpretive execution data. The decoder further includes a program memory and interpreter circuit operatively coupled to the memory manager. Downloaded data is presented to the interpreter by the dialogue processor which receives instructions in response from the interpreter to execute a particular instruction set or sequence group within the stored program. All instruction sets or sequence groups within the stored program are free of loops or branch backward instructions to avoid lockout problems.

32 Claims, 8 Drawing Sheets

TR Interrupt

TELEVISION DISTRIBUTION SYSTEM HAVING VIRTUAL MEMORY DOWNLOADING

CROSS-REFERENCE TO RELATED PATENT APPLICATION

This application is related to a copending application entitled TELEVISION DISTRIBUTION SYSTEM HAVING DOWNLOADABLE INTERPRETIVE EXECUTION, filed Sep. 1, 1993 having Ser. No. 08/115,378 which is assigned to the assignee of the present application.

FIELD OF THE INVENTION

This invention relates generally to television cable distribution systems and particularly to those utilizing out of band communication capabilities.

BACKGROUND OF THE INVENTION

The cable distribution system for television communication has become a substantial part of television broadcast operation. In a typical cable system, a so-called headend facility is maintained by the cable system operator which provides a plurality of television programs modulated upon a corresponding plurality of television channel frequencies. A plurality of decoders are operative within the subscriber homes and other facilities which are coupled to the headend of the cable system by a distribution network. The function of the receiver decoders is to provide channel selection and recovery of the program material for use by the subscriber's television receiver. In most systems, the headend includes the capability for scrambling some or all of the program channels to render them unviewable without a corresponding descrambling process within the receiver decoders. This descrambling capability is controlled in a process known as authorization.

The cable headend system also provides operational information together with the programming material such as program or channel authorization, channel mapping and other features which require communication between the headend and the system decoders. In many cable systems, this communication takes place in a protocol known as in-band communication by inserting the additional information into portions of the program signal. These systems are referred to as in-band because of the communication taking place within the channel bandwidth of the television program channel.

In other systems, the in-band communication is supplemented by an out of band communication capability so named because of the use of communication channels outside the television program channel. Typically, an available broadcast frequency such as a FM radio frequency is used to provide this out of band communication. In such systems, data from the head end controller is modulated upon an FM radio frequency carrier and received by FM receivers within the system decoders. The modulated data is recovered by the decoder receivers and used to operate the decoders in response to the headend data.

The desire to effectively use the out of band communication capability to maximize system flexibility and potential while avoiding undue operational complexity and system difficulties creates a continuing need in the art for evermore improved cable communication systems.

Accordingly, it is a general object of the present invention to provide an improved cable communication system. It is a more particular object of the present invention to provide an improved out of band cable communication system.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
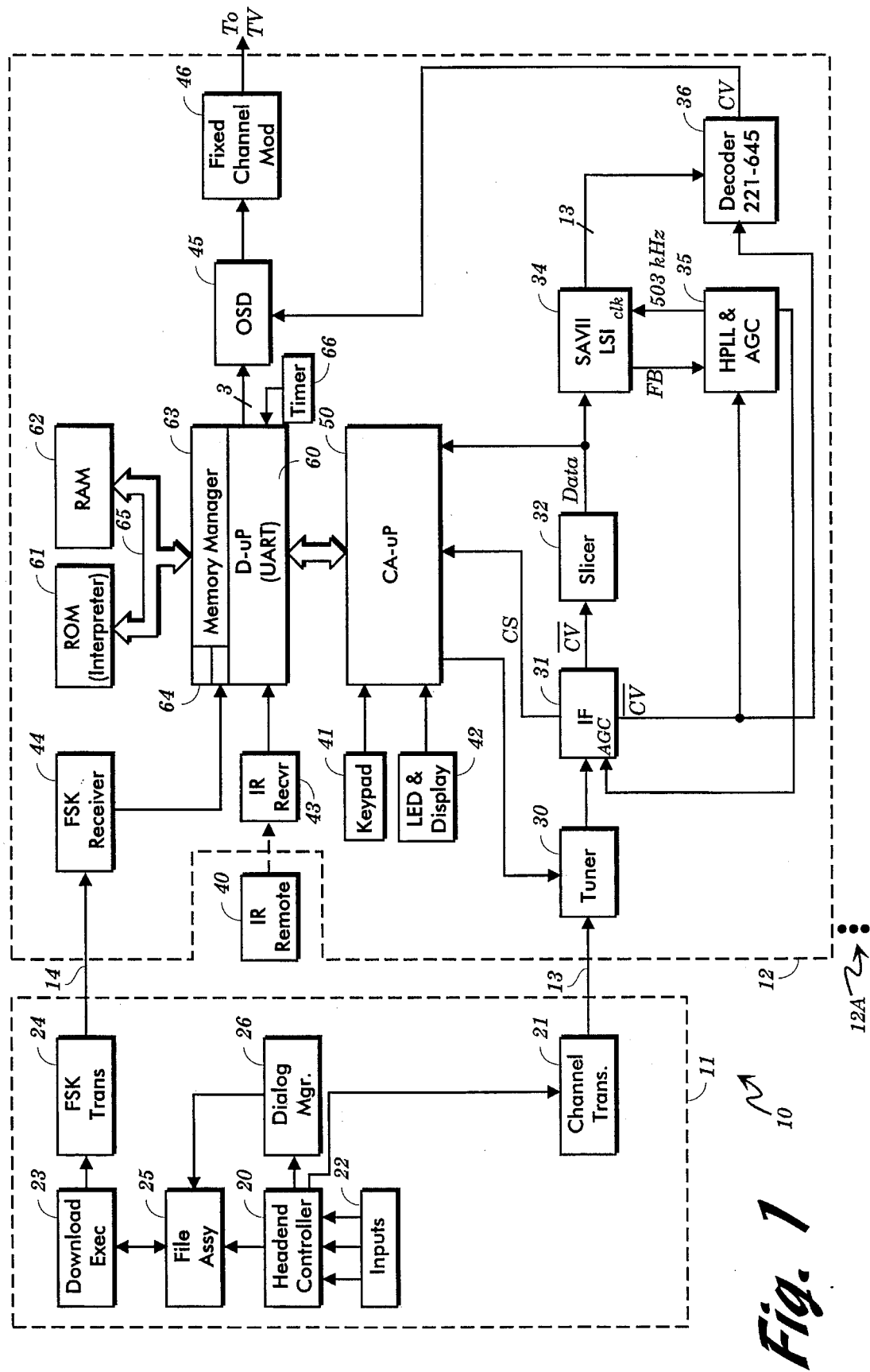
FIG. 1 sets forth a block diagram of a television distribution system constructed in accordance with the present invention.

FIG. 1 sets forth a block diagram of a portion of a television cable system constructed in accordance with the present invention and generally referenced by numeral 10. Cable system 10 includes a headend unit enclosed within dashed line 11 and a typical decoder enclosed within dashed line enclosure 12. Additional decoders are represented by dots 12A. Headend 11 and decoder 12 are coupled via an in-band communication link 13 and an out of band communication link 14. Headend 11 includes a headend controller 20 having a plurality of input terminals 22 coupled thereto. A file assembler 25 is coupled to headend controller 20 and to download executive 23. A dialogue program manager 26 is coupled to headend 20 and to file assembler 25 and download executive 23. Headend controller 20 is further coupled to a channel transmitting system 21 which in accordance with conventional fabrication techniques produces a plurality of program signals and in-band operational data modulated upon a plurality of television channel frequency carriers which are applied to in-band communication link 13. Headend 11 further includes a download executive system 23 coupled to an FSK transmitter 24 which in turn is coupled to out of band data link 14. In its most typical form, FSK transmitter 24 includes a data modulating system operable upon a predetermined carrier such as an FM radio frequency carrier to provide a data modulated signal upon communication link 14.

It will be apparent to those skilled in the art that in accordance with the intended operation of a cable television distribution system, a great number of receiver decoders, as indicated by dots 12A, are coupled to headend unit 11 via in-band communication link 13 and out of band communication link 14. Thus, it will be apparent to those skilled in the art that while a single receiver decoder 12 is shown in FIG. 1, it is illustrative of a plurality of decoders 12A similarly fabricated which in the anticipated cable system would be operatively coupled to headend unit 11. More specifically, decoder 12 includes a tuner 30 coupled to an intermediate frequency amplifier 31 which in turn is coupled to a data slicer 32. The output of data slicer 32 is coupled to a combined sync suppression and video inversion circuit 34. A horizontal phase lock loop and automatic gain control system 35 is operatively coupled to circuit 34 and to a gain control system within IF amplifier 31 (not shown). A decoder and descrambler 36 is coupled to combination circuit 34 and to the scrambled video output signal of IF amplifier 31.

A conditional access microprocessor 50 comprises a predefined function processor coupled to tuner 30, IF 31 and the output of data slicer 32. A keypad 41 provides an input to processor 50. An LED display 42 providing a digital output display is coupled to and controlled by processor 50.

An FSK receiver 44 is coupled to out of band link 14. A dialogue microprocessor 60 includes a memory manager 63 together with a pair of input buffers 64. Buffers 64 are coupled to the recovered data output of FSK receiver 44. An interpreter 61 and a random access memory 62 are operatively coupled to memory manager 63 by a data link 65. An on-screen display system 45 constructed in accordance with conventional fabrication techniques is coupled to a fixed channel modulator 46, the output of which is coupled to a television receiver (not shown) constructed in accordance with conventional fabrication techniques. On-screen display 45 is further coupled to the unscrambled composite video output of descrambler 36. An infrared signal receiver 43 is coupled to microprocessor 60 and is operatively associated with a user accessible infrared remote control 40.

In operation and by way of overview, cable system 10 operates using an out of band communication supplement to the in-band communication system. Thus, program channel information modulated upon a plurality of program channels is communicated between headend 11 and decoder 12 through in-band communication link 13. Additional operational and housekeeping data is also communicated via in-band link 13 using the data transmission protocol of the transmitted television signal described below. Concurrently, headend system 11 further includes an out of band communication capability which is operative to permit the headend controller to communicate and affect the operation of decoder 12 using data transmitted over out of band communication link 14. Thus, decoder 12 is provided with two sources of data communication with headend 11. In contrast to in-band communication link 13, out of band communication link 14 is not encumbered with program information and limitations imposed thereby and thus is typically continuously operable to continuously transmit data over out of band link 14. As a result, a substantially greater amount of operational data may be communicated using out of band link 14.

More specifically, in response to inputs from input 22, headend controller 20 will require a download of data to all or some of the decoders within the cable system. Headend controller 20, dialogue manager 26 and file assembler 25 cooperate to assemble a plurality of data files within file assembler 25 which assembles the raw to-be-downloaded data into groups of records. Each group is formed of records having the same record type, the same record length and which are intended for download to the same decoder or group of decoders within the system.

Once a group of records has been assembled or grouped in this manner within file assembler 25, download executive 23 begins the process of formatting the group of records for download in accordance with the present invention system. Initially, the executive 23 determines the initial parameters of the record group such as the amount of memory which will be required to receive the download within the decoders and the number of records which will be required to properly download the data. Thereafter, the download executive formats the records in a record set by performing the following procedures. Initially, the first record within the record set is assembled to define the record structure which will be used for all records within the set. Next, the data within the record will be encrypted if encryption is required. Not all records require encryption within the system. Different forms of encryption may be utilized with the object of providing protection from unauthorized use of the data. In a typical encryption format, a cross-referenced encryption look up table is maintained within the headend system while a corresponding inverse look up table used for decryption is maintained within the decoder.

Once the encryption, if required, has been performed, the executive forms the number of data packets for each record within the set. The structure of the data packets is set forth below in FIG. 7 and described therein in greater detail. However, suffice it to note here that each data packet includes a record within the set together with an initial packet start indicator, certain housekeeping information such as a sequential number for the packet within the series, error detection in accordance with the CRC-32 system, and an end of packet indicator as the final packet element.

Once the records have been assembled into a packet series, the executive then transfers the packets to FSK transmitter 24 which then broadcasts the packets via out of band communication link 14. In accordance with an important aspect of the present invention, the series of data packets for a given record set are communicated over link 14 in a periodically recirculating fashion which, as described below, permits the decoder to receive the initial packet, process it, and then examine other broadcast data packets until the next sequence numbered packet is downloaded and so on until all packets within the series have been received and processed. Because of the time required for processing a given data packet, the packet series may be, i.e. rebroadcast, many times until all packets in the series have been successfully downloaded. This packet circulation process greatly reduces the memory required for downloading within the decoders and expands the system capability and flexibility.

At the decoder, a process which is substantially the reverse of the process carried forward within headend 11 takes place. Each data packet received by the decoder is temporarily stored within a buffer and is examined for series number, address and sequence number. In this manner, the decoder determines whether the examined data packet is intended for that particular decoder and whether the data packet is the next packet within the series upon which the present decoder is operative. It should be recalled that each packet is uniquely identified as a particular sequence numbered packet within a particular series of packets. Thus, the decoder sequentially recovers packets within a given series of data packets and correspondingly sequentially recovers the records therein. The sequential records are in accordance with the operation set forth below presented to an interpreter for instructions to which the system process responds to implement the downloaded data.

Tuner 30 operates in response to data supplied by microprocessor 50 to select a specific program channel to be received via in-band link 13. Tuner 30 couples the selected program signal to intermediate frequency amplifier 31 which recovers the modulated sync and video information and couples it to data slicer 32 in the form of a scrambled composite video signal. In addition, intermediate frequency amplifier 31 couples the composite sync signal to microprocessor 50. Data slicer 32 unscrambles the received composite video data signal and applies it concurrently to microprocessor 50 and combination circuit 34. Because, in most instances, the video itself is scrambled, combination circuit 34 operates upon the applied data to drive descrambler 36 which in turn produces an unscrambled composite video signal for application to on-screen display system 45. Horizontal phase-locked loop and automatic gain control system 35 produces an amplitude gain voltage which is applied to intermediate frequency amplifier 31 to maintain a constant signal level. Thus, tuner 30, intermediate frequency amplifier 31, data slicer 32, combination circuit 34, phase-locked loop and automatic gain control 35 and decoder 36 cooperate to receive a selected television channel and recover the program information therefrom for use in operating on-screen display 45. By means set forth below in greater detail, the particular channel received by tuner 30 is selected in response to the user's input via keypad 41 to microprocessor 50. By means also set forth below, microprocessor 50 responds to provide the required information to tuner 30 to properly configure tuner 30 to receive the desired program channel. In addition, microprocessor 50 configures display 42 to display the channel numbers of the selected program channel.

In accordance with an important aspect of the present invention, additional data may be communicated from headend 11 via out of band communication link 14 using inputs 22, controller 20, download executive 23 and transmitter 24. As mentioned above, it is anticipated that the out of band communication on link 14 will comprise a single direction continuous or repetitive communication in which the to-be-communicated data is periodically repeatedly broadcast as part of a generally continuous data stream. In further accordance with the present invention, the data communication via out of band link 14 utilizes interpretive execution rather than the conventional downloading of native or raw data code. Thus, the interpretive code recovered by FSK receiver 44 is applied to memory manager 63 of microprocessor 60. In accordance with the operation set forth below in greater detail, the interpretive code recovered by FSK receiver 44 is initially loaded into buffers 64 within processor 60 and thereafter operated upon in accordance with interpreter 61. Thus, memory manager 63 communicates the received interpretive code to interpreter 61 via data link 65 and in response thereto, receives the appropriate instruction or direction. In this manner, the operation of microprocessor 60 and memory manager 63 cooperate with interpreter 61 to convert the interpretive code received by directing processor 60 to a specific portion of a dialogue program stored within memory 62. In further accordance with the present invention, memory 62 includes a dialogue program comprising a plurality of instruction sets each having a series of sequential instruction steps. Once processor 60 has been directed to the initial instruction within a given series of instruction steps, processor 60 carries forward with the instruction steps therein in a sequential manner until the particular instruction set or group is completed. In accordance with an important aspect of the present invention, each instruction set portion or sequence group within the dialogue program is precluded from including a loop or branch backwards instruction. This ensures that once a particular instruction set portion or sequence group within the dialogue program is entered, processor 60 will at some point complete the instruction set or sequence group and will, as a result, be freed up to receive the next set of instructions. As a result, the system is protected against the problems of lockout.

This lockout proof capability of the present invention system is particularly advantageous due to the one-way transmission provided by out of band link 14. Such one-way transmission systems tends to experience difficulties due to the inability of the receivers to disconnect from the system or provide major system operation changes during system active use. In other words, the present invention system due to the use of sequential instruction sets which by design are free of either loop or branch backwards actions provide an assurance that the system decoder will, despite being subjected to extremely erroneous data, recover its capability to accept and respond to a corrective download which will reconfigure the system properly. In addition, memory 62 is organized in a segregated fashion such that certain portions of the dialogue program stored therein may not be changed by the execution of an instruction set portion or sequence group but rather may only be changed by data which is directly downloaded from headend 11 and out of band link 14.

Thus, in accordance with the interpretive execution of the present invention system, processor 60 responds to each instruction, command, or data transmission received by initially applying the received information to interpreter 61 which in turn responds to the applied information by providing an instruction to processor 60 which directs it to a specific instruction set portion or sequence group within the dialogue program stored in memory 62. This applies whether the input to processor 60 is received from processor 50, FSK receiver 44 or infrared receiver 43. For example, in a typical decoder operation, the user may elect to tune a specific selected channel by inputting the channel number using keypad 41. The keypad input is communicated by processor 50 to processor 60 without interpretation. Processor 60 then utilizes memory manager 63 to present the instruction to interpreter 61. Interpreter 61 in turn directs memory manager 63 and processor 60 to the corresponding instruction set portion or sequence group within the dialogue program of memory 62 which is used to tune the selected channel. Processor 60 then works through the sequential steps within the instruction set to provide the appropriate instructions to processor 50 which in turn responds by producing the tuner control signals which configure tuner 30 to receive the selected program channel. A similar process takes place in response to other user inputs via keypad 41 or remote 40 and infrared receiver 43.

The present invention system responds in a similar fashion to data communicated via out of band link 14 and FSK receiver 44. In accordance with the process set forth below in greater detail, the communicated data is organized into a plurality of data packets each of which is preceded by a packet start indicator and packet end indicator as well as a sequence number. Thus, data is downloaded in the form of a series of data packets each of which is individually processable and sequentially related to the other data packets within the download. In its preferred form, memory manager 13 includes a pair of buffers within buffers 64 which may used in an alternating fashion by processor 60. In this alternating process, one buffer is receiving and storing an incoming data packet while the other is being accessed by processor 60 to transfer the data therefrom to interpreter 61 for interpretation. The response of processor 60 to each data packet is this application or presentation of the data therein to a interpreter 61 to receive direction as to the specific instruction set portion or sequence group within the dialogue program of memory 62. If, for example, a determination is made at headend 11 to change the carrier frequency of a particular program channel for decoder 12, the appropriate data is configured within download executive 23 into a series of sequential data packets having appropriate start and end indicators together with sequence numbers and other operational data. As the data within the data packets is recovered and organized, the original downloaded data is reconstructed within memory manager 63 and thereafter presented to interpreter 61 which responds by directing processor 60 to the instruction set portion or sequence group within the dialogue program which will provide implementation of the change in carrier frequency.

As the present invention system functions in accordance with the downloadable interpretive execution operation, the headend controller is capable of configuring each decoder within the system to provide the desired changes of configuration. Thus, great flexibility is provided in the system response to downloaded code. In addition, the system is capable of permitting the user to exercise significant customization or personal configuration by inputting the keypad or remote data inputs which are interpreted by interpreter 61 and processed by processor 60. In each case, the interpretive execution in which processor 60 brings each downloaded data record or user input to interpreter 61 for interpretation and instruction to the appropriate portion of the dialogue program within memory 62 permits the organization of the dialogue program to be segmented into the defined nonlooping or nonbackwardly branching instruction set portions or sequence groups described above. This in turn provides great flexibility of operation with limited data requirements while also assuring that the processor will, despite erroneous and incorrect or contaminated data, become freed up to accept a corrective input or download of data. To further protect the present invention system against the problems of lockout exhibited by other systems, a maximum number of executable instructions is stored within memory 62 to provide a backup condition in which the processor becomes freed and able to accept new instructions regardless of operating conditions once the predetermined number of instruction steps has been carried forward. Timing circuit 66 is operative to provide the timing operations for processor 60 and includes a plurality of resettable clocks operative in the manner set forth in the flow diagrams below. In accordance with the operation set forth below in FIGS. 2 through 6, processor 60 operates in an ongoing process which is subject to interruption by the occurrence of certain events within the system. These events may, for example, include the timing out of the time base within timer 66, the need to communicate between processors 50 and 60 via access link 51, the occurrence of an out of band data download, or the reception of an infrared remote transmitted signal from infrared remote controller 40 and receiver 43. These types of events trigger system interruptions in which processor 60 temporarily leaves the main program at the next acceptable point and performs the necessary operations to respond to such events and thereafter returns to the main program in process.

Figure 2A:
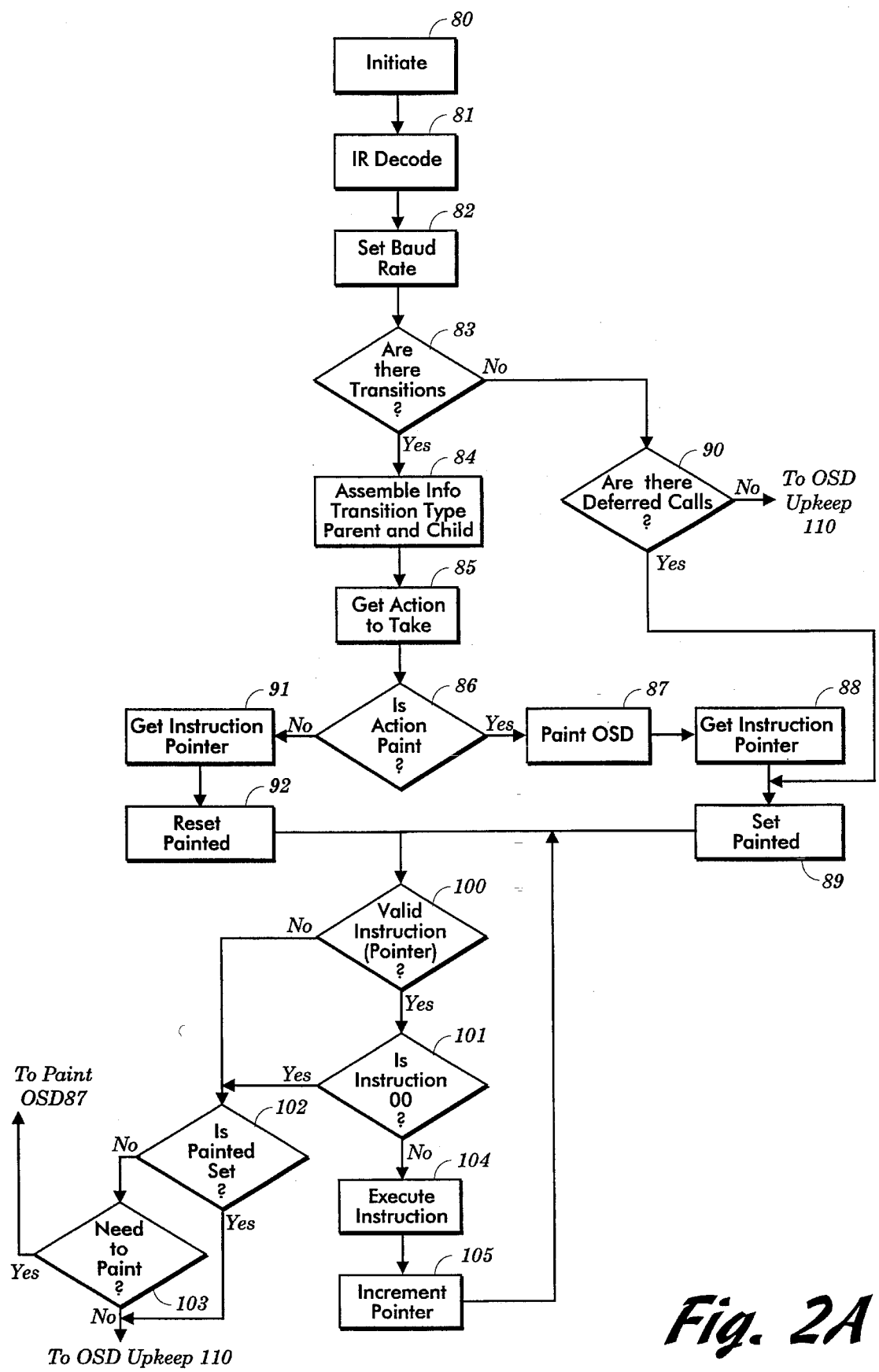
FIGS. 2A, 2B and 2C when taken together set forth a flow diagram of the operation of the present invention system.
Figure 2B:
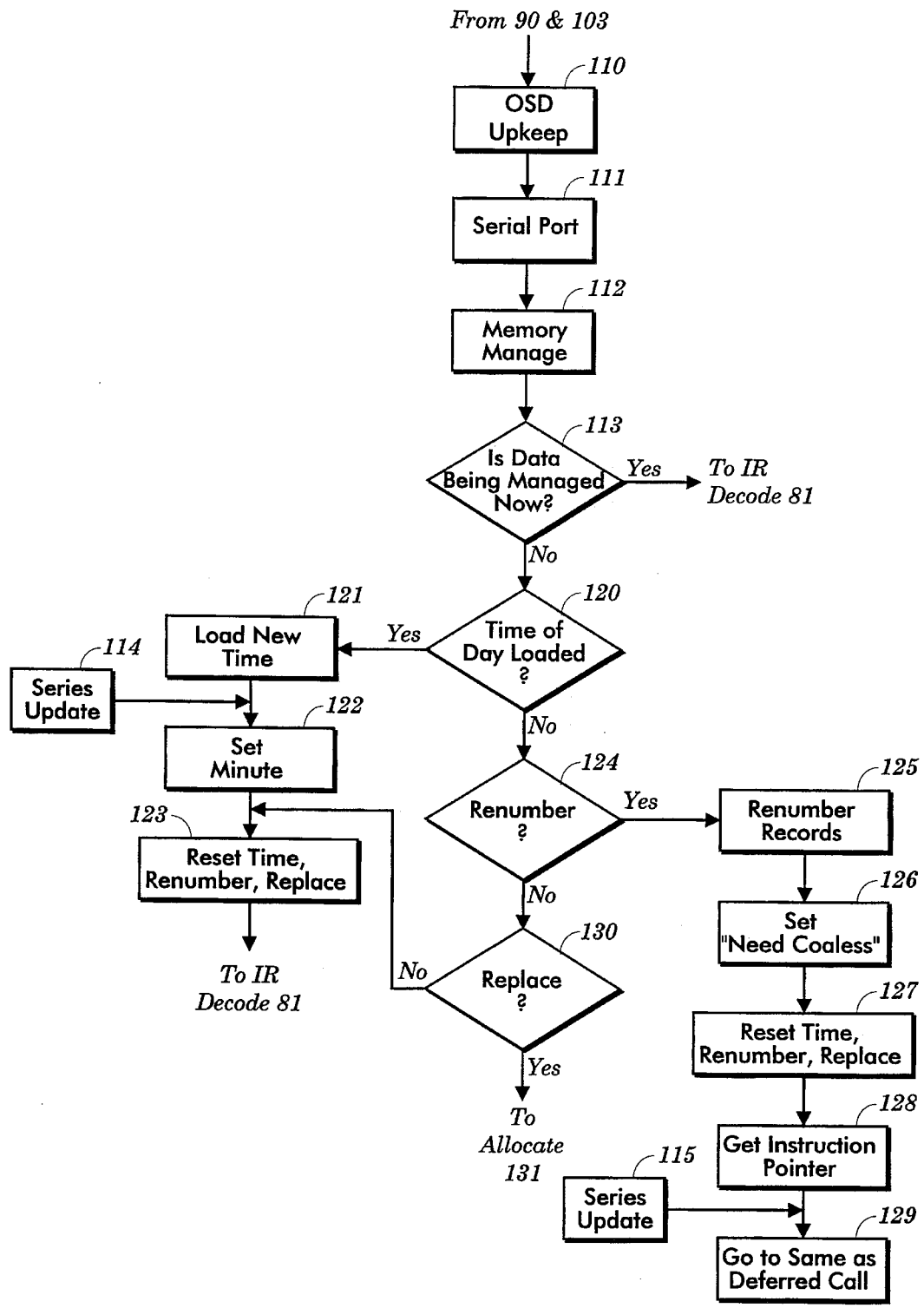
Figure 2C:
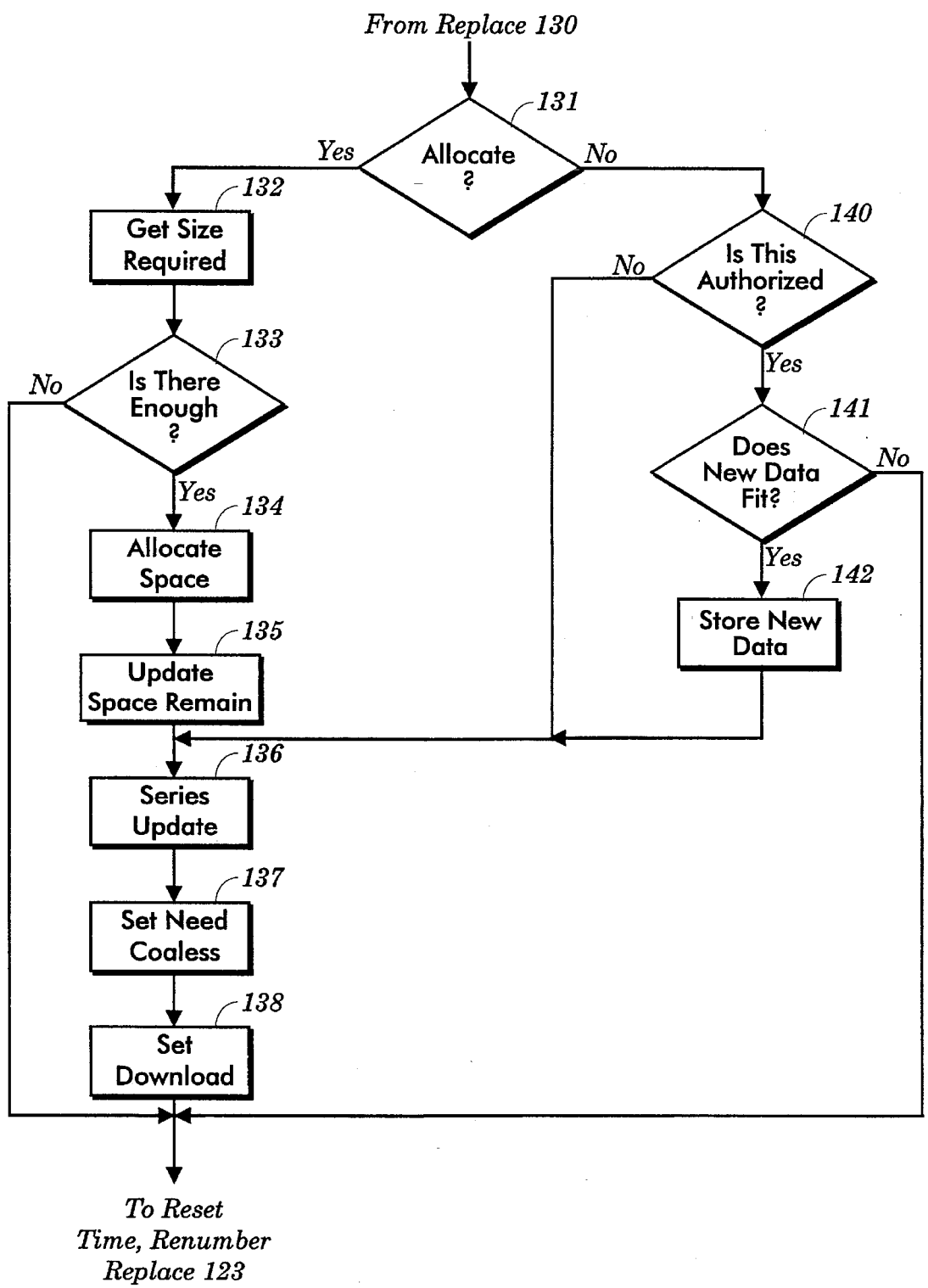
Figure 3:
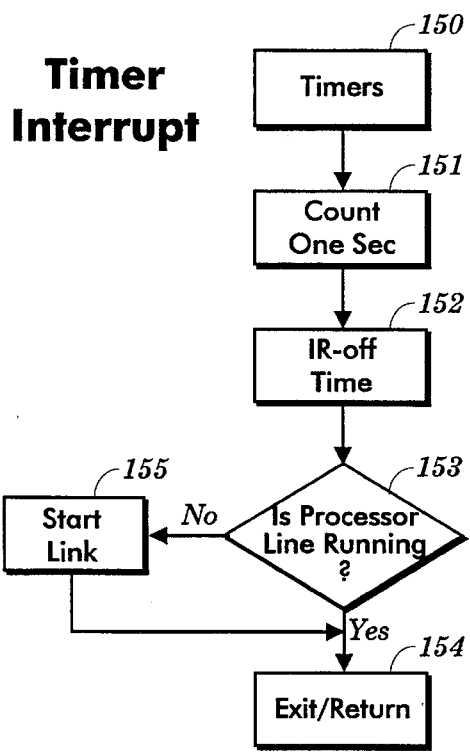
FIG. 3 sets forth a flow diagram of the timer interrupt process of the present invention system.
Figure 4:
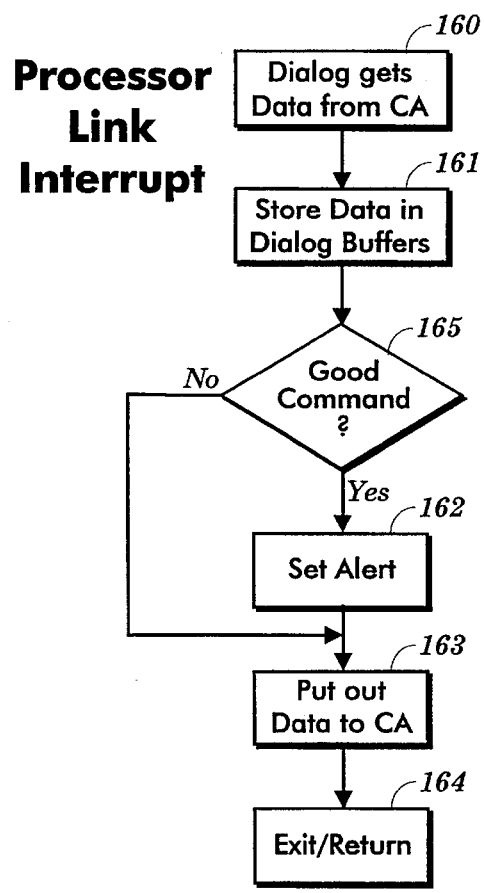
FIG. 4 sets forth a flow diagram of the processor link interrupt operation of the present invention system.

By way of overview, FIGS. 2A, 2B and 2C when taken together set forth flow diagrams showing the main program or ongoing operation of processors 60 and 50. FIGS. 3 and 4 set forth the flow diagrams of the timer interrupt and processor link interrupt respectively while the interrupt resulting from out of band data downloading is set forth in FIGS. 5A and 5B taken together. Finally, FIG. 6 sets forth the interrupt which occurs in response to the user's input of a remote control signal via remote control 40 and infrared receiver 43.

More specifically, and with respect to FIG. 2A, the system operation commences at an initiate step 80 following which the infrared decode and baud rate are set in steps 81 and 82. Thereafter, the system moves to step 83 in which a determination is made as to whether transition events or transitions have been detected. Examples of transitions for which the system searches at step 83 include infrared remote inputs, the user access of keypad 41, video information such as authorization requests and the like, the timing expiration of one of the timers within timing circuit 66, an out of band data download via FSK receiver 44 and out of band link 14, and the maintenance of the system clock referred to as "minute". In the event no transitions are detected, the system moves to step 90 in which a determination is made as to whether deferred calls are present. These deferred calls comprise instructions which have been stored during interpretative actions. In the event no deferred calls are present, the system moves to on-screen display upkeep step 110 (seen in FIG. B). If, however, deferred calls are present, the system moves to step 92 in which the painted flag is reset.

Returning to step 83, in the event a transition is found, the system moves to step 84 in which the information such as transition type and parent and child state are assembled. Thereafter, the system moves to step 85 in which the appropriate action to be taken is retrieved following which the system moves to step 86 to determine whether the action to be taken is a paint action. Paint actions comprise the video information display on on-screen display 45 (seen in FIG. 1). If the action is not a painting action, the system moves through steps 91 and 92 to locate the instruction pointer and reset the painted flag indicating no paint operation was done. In the event the action determined at step 86 requires a paint operation, the system moves to step 87 in which the on-screen display is painted, displaying the required video information. Thereafter, the system moves through steps 88 and 89 in which the instruction pointer is located and the painted flag is set indicating a paint operation was done. At step 100, a determination is made as to whether a valid instruction is present. If the instruction is valid, the system moves to step 101. If not, it moves to step 102. At step 101, a determination is made as to whether the instruction comprises a zero indicative of the end of an instruction sequence. If the zero end of instruction indicator is not present, the system moves to steps 104 and 105 respectively in which the instruction is executed and the instruction pointer is incremented to the next instruction. Thereafter, the system returns to step 100 in a cyclical process which is repeated until a zero instruction indicating the end of the instruction set is found at step 101. Once the end indicating zero instruction is found, the system moves to step 102 in which a determination is made as to whether the painted flag is set. If the painted flag is set, the system moves directly to on-screen display upkeep 110 (seen in FIG. 2B). If the painted flag is not set, the system moves to step 103 to determine whether a paint action is requested. If no paint action is requested, the system moves to on-screen display upkeep 110. If a paint operation is needed, the system returns to paint on-screen display step 87.

FIG. 2B continues the flow diagram initiated in FIG. 2A and thus the system moves from steps 102 and 103 in FIG. 2A to step 110 in FIG. 2B in which on-screen display upkeep is implemented. On-screen display upkeep involves the ongoing maintenance of the appropriate video display for the television receiver responding to decoder 12. Thereafter, the system moves to steps 111 and 112 in which additional ongoing maintenance operations are performed. At step 111, the non-volatile memory within memory 62 (seen in FIG. 1)

is updated, while in step 112 the memory management or organizational functions are carried forward. Thereafter, the system moves to step 113 in which a check is made for an ongoing data management process. In the event data is being managed, the program returns to step 81. New leads to memory via FSK receiver will wait until memory is in a steady state. If no management is taking place, FSK data is checked. In the event at a "time of day" download the system moves to steps 121 through 123 and step 114 in which a new time is loaded into the clock, the minute change is set and the time, renumber and replace flags are reset. Thereafter, the system returns to IR decode step 81 (shown in FIG. 2A).

Returning to step 120, in the event a time of day has not been loaded, the system moves to step 124 in which a determination is made as to whether the renumber flag has been set. In the event a renumber flag is found, the system moves to step 125 in which the affected records are renumbered and thereafter to a step 126 in which a need coaless flag is set. This process of renumbering records and coalessing the memory is used to fill otherwise unused portions of the memory and make additional memory available. The system then moves to step 127 in which the time, renumber, and replace flags are reset afterwhich the system moves to step 128 in which the instruction pointer is located and thereafter to steps 115 and 129. With the instruction pointer located, the system moves to deferred calls step 90 (seen in FIG. 2A). Returning to step 124, in the event renumbering is not required, the system moves to step 130 in which a determination is made as to whether a record requires replacement. If no replacement is required, the system moves to step 123. If, however, replacement is required, the system moves to allocate step 131 in FIG. 2C.

FIG. 2C sets forth the remainder of the main program set forth in FIGS. 2A and 2B above and continues following step 130 in FIG. 2B afterwhich the system moves to an allocate step 131. Allocation refers to the process in which memory space is reserved or set aside for a particular record in the systems operation. Thus, at step 131, in the event an allocation requirement is determined, the system moves to step 132 in which the size of the to-be-allocated portion of memory is determined. Thereafter, the system moves to step 133 in which the existing memory space is evaluated and a determination is made as to whether sufficient memory space is available to allocate. If insufficient space is available, the system moves directly to step 123 (seen in FIG. 2B) in which the time, renumber, and replace flags are reset and thereafter returns to the beginning of the main program in FIG. 2A at step 81. If however, sufficient space is available within the memory, the system moves to step 134 in which the required space is allocated or reserved and thereafter, through step 135 in which the remaining space indicator is updated. The system then moves through step 136 in which the series numbers are updated afterwhich the need coaless flag is set at step 137 and the download flag is set at step 138. Thereafter, the system moves to step 123 in FIG. 2B. Returning to step 131, in the event no request for allocation is found, the system moves to step 140 in which a determination is made as to whether the download is an authorized download. If the download is unauthorized, the system moves to step 136. If, however, the download is authorized, the system moves to step 141 in which a determination is made as to whether the data will fit in available memory. If the data will fit, the system moves to step 142 and stores the new data afterwhich the system moves to step 136. If the new data does not fit in available space, the system moves directly to step 123 (seen in FIG. 2B).

The above-described process shown in FIGS. 2A, 2B and 2C sets forth the primary or main operative program of the present invention system. As mentioned above, a number of interrupt subprograms are operated within the present invention system and represent temporary diversions from the main program shown in FIGS. 2A through 2C. These interrupts are set forth in FIGS. 3 through 6 and each are characterized by an initial departure from the ongoing main program followed by an exit or return to the point of interruption in the main program.

FIG. 3 sets forth the process undertaken in response to a timer interrupt. Once the time base has timed out, the system enters the timer interrupt at step 150 afterwhich a one second count is implemented at step 151. As mentioned above, a plurality of timers are operative within the present invention system. These timers are incremented, and any time out indicated, at the time base. Thereafter, the infrared off timer is timed out at step 152 following which the system moves to a step 153 to determine whether or not the process link (that is the communication link between processors 50 and 60 in FIG. 1) is running. In the event the processor link is running, the system moves to an exit and return step 154 directly. If, however, the processor link is not running, the system moves through a step 155 in which the link is activated and afterwhich the system moves to step 154.

FIG. 4 sets forth a processor link interrupt flow diagram which depicts the system response to activation of the processor link. Thus, beginning at step 160 in which the dialogue processor (processor 60 in FIG. 1) receives data from processor 50. Thereafter, the system moves to step 161 in which the data is stored within the buffers of processor 60. Next at step 165, a determination is made as to whether a full command from processor 50 is received. If a full command is received, the system then moves to step 162 in which an alert flag is set afterwhich the data to be transferred from processor 60 to processor 50 is transferred. Once this transfer is complete, the system moves to exit/return step 164 and resumes the processing at the point of interrupt. In the event a full command has not been received, the system moves directly to step 163 and proceeds.

Figure 5A:
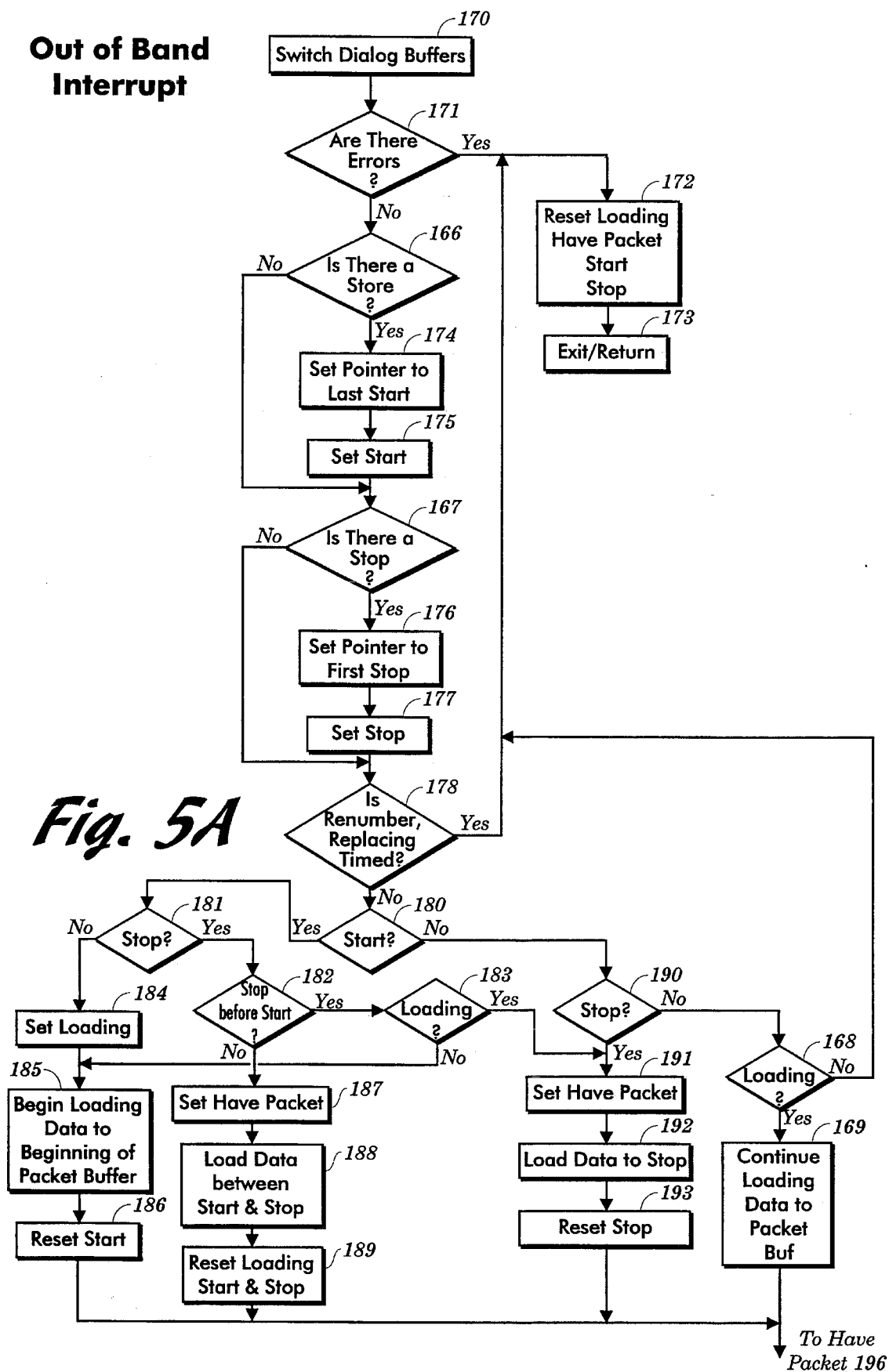
FIGS. 5A and 5B when taken together set forth a flow diagram of the out of band communication interrupt operation of the present invention system.
Figure 5B:
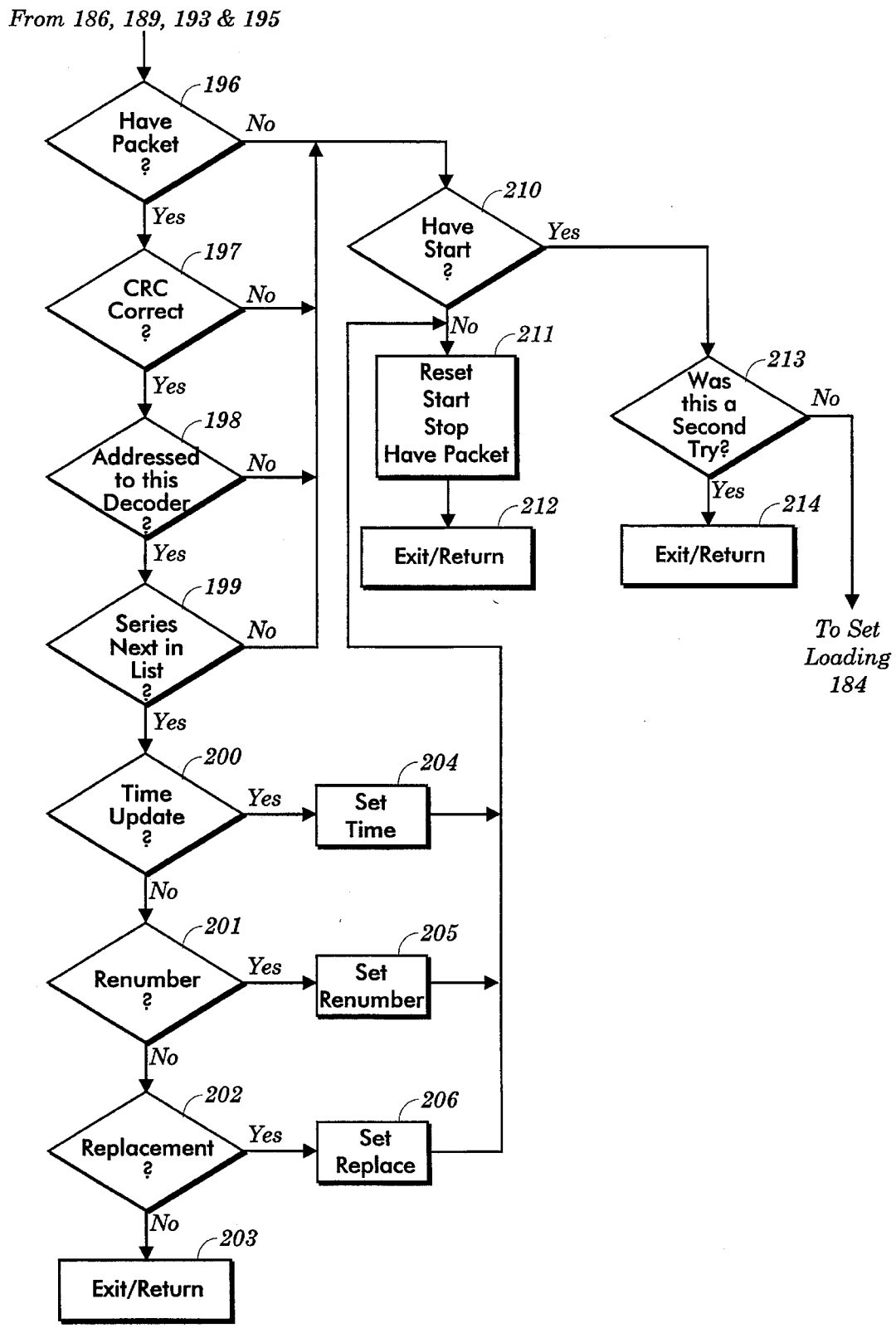

FIGS. 5A and 5B set forth the system processing in response to an out of band data interrupt. Thus, upon the occurrence of a download of data via out of band link 14 and FSK receiver 44 (seen in FIG. 1), the system initially switches the dialogue processor buffers at step 170. As described above, the use of alternating buffers within memory manager 63 of dialogue processor 60 permits the system to simultaneously evaluate data being downloaded into one buffer while the downloading process continues into the alternate buffer. At step 171, the downloaded data is examined to determine the presence of errors and to carry forward checks for parity, overrun, framing and carrier detection. In the event no errors are found, the system moves to step 166 and a start indicator is looked for. It should be recalled that the out of band data is downloaded in a plurality of data packets each having a packet start and packet end or stop character together with a sequence number and the data portion itself. If no start indicator is found, the system moves to step 167 and looks for a stop indicator. If no stop indicator is found, the system moves directly to step 178. If, however, a start is found at step 166, the system moves to step 174 and the system pointer is set to the last start indicator and at step 175, the start flag is set. Similarly, if a stop is found at step 167, the system moves to step 176 and a pointer is then set to the first stop indicator at step 177. Thus, the system tags the last start and first stop indicators within the data received. Thereafter, at step 178, a determination is made as to whether the data manager is working on a previous renumber, a replacement, or a time of day set. In the event it is not, the system moves to step 180 in which a determination is made as to whether a start indicator has been found. If a start indicator is present, the system moves to a step 181 in which a determination is made as to whether a stop indicator has been found. If a stop indicator has been found, the system moves to step 182 in which a determination is made as to whether the stop preceded the start. If the start indicator preceded the stop indicator (which then should indicate a complete data packet inbetween), the system moves to step 187 in which the flag indicating a data packet has been received or "have packet" is set. Thereafter, the system moves to step 188 in which the data between start and stop is loaded to the main packet buffer afterwhich at step 189, the loading, start, and stop flags are reset and the system moves to step 196 in FIG. 5B.

Returning to step 171, in the event errors or improper parity or other defects are discovered at step 171, the system moves to step 172 in which the loading, have packet, start, and stop flags are reset. Thereafter, the system moves to exit/return step 173 and resumes the interrupted main processing. Returning to step 180, in the event a determination is made at step 180 that no start indicator is present, the system moves to step 190 in which a determination is made as to whether a stop indicator is present. If no stop indicator is present, the system determines at step 194 whether data loading is taking place. If no data loading is taking place, the system returns to step 172. If, however, data loading is taking place, the system moves to step 195 and continues loading data to the main packet buffer afterwhich it moves to have packet step 196 (seen in FIG. 5B). If a determination is made at step 190 that a stop indicator is present, the system moves to step 191 at which the have packet flag is set afterwhich the system moves through step 192 in which the data preceding the stop indicator is loaded. Thereafter, the stop flag is reset at step 193 and the system moves to step 196. If no stop indicator is found at step 190, the system moves to step 168 to look for data loading to the packet buffer. If loading is found, the system moves to step 169 and continues loading. If loading is not found, the system returns to step 172.

Returning to step 181, in the event a determination is made that no stop indicator is present, the system moves to step 184 in which the loading flag is set afterwhich the system moves to step 185 and begins loading data to the beginning of the main packet buffer. Following the loading at step 185, the system moves to step 186 and resets the start flag and thereafter moves to step 196.

Returning to step 182, in the event a determination is made that a stop indicator precedes the start indicator, the system moves to step 183 to determine whether loading is in process. If not, the system moves to step 185. If loading is occurring, the system moves to step 191.

Following the above-described processing, the system has moved to step 196 shown in FIG. 5B in which a determination is made as to whether a complete packet of data has been received. As mentioned above, a complete data packet comprises a start indicator, a stop indicator, a sequence number and the data itself. In the event a complete data packet is not present, the system moves from step 196 to step 210 in which a determination is made as to whether a start indicator is present. If a start indicator is present, the system moves to step 213 to determine whether the previous examination was a second attempt at packet examination. If not a second attempt, the system moves to step 184 in FIG. 5A. If, however, the attempt was a second attempt, the system moves to exit return step 214 and resumes the main program operation. If at step 210 no start indicator is found, the system moves to step 211 at which the start, stop and have packet flags are reset afterwhich the system returns to main program operation via exit/return step 212.

Returning to step 196, in the event a complete packet is found, the system moves through a series of packet checking steps 197, 198 and 199 which determine the presence of the necessary criteria for continuing to evaluate this packet. Thus, at step 197, a check sum evaluation is carried forward in which the sum of digits within the packet is checked against a CRC number. If the check fails, the system moves to step 210. If, however, a correct sum is found, the system then determines whether the packet is addressed to this particular decoder by examining the address within the packet. If not addressed to this decoder, the system returns to step 210. If this decoder is being addressed, the system moves to step 199 to determine whether this particular packet is the next packet in the series being assimilated by the decoder. As mentioned above, the downloaded data is organized into a series of sequentially numbered data packets each having a sequence number associated therewith. These packets are repeatedly downloaded and upon completion of one packet processing, the system then looks for the next packet in the packet sequence. Thus, in the event the packet being examined is not the next packet in the sequence, the system returns to step 210. If, however, the packet being examined is the next packet, the system moves to step 200 in which the presence of a time of day update is determined. If a time of day update is present, the system moves to step 204 setting the time flag and thereafter moves to step 211. If no time update is set, however, the system moves to step 201 to determine whether a renumber instruction is present. If a renumber instruction is present, the system moves to step 205 and sets the renumbered flag afterwhich it moves to step 211. In the event the instruction is not a renumber, the system moves to step 202 and determines whether the instruction is a replacement. If the instruction is a replacement, the system moves to step 206 and sets the replacement flag afterwhich it moves to step 211. If the instruction is not a replacement, the system returns to the main program at the point of interruption via exit/return step 203.

Figure 6:
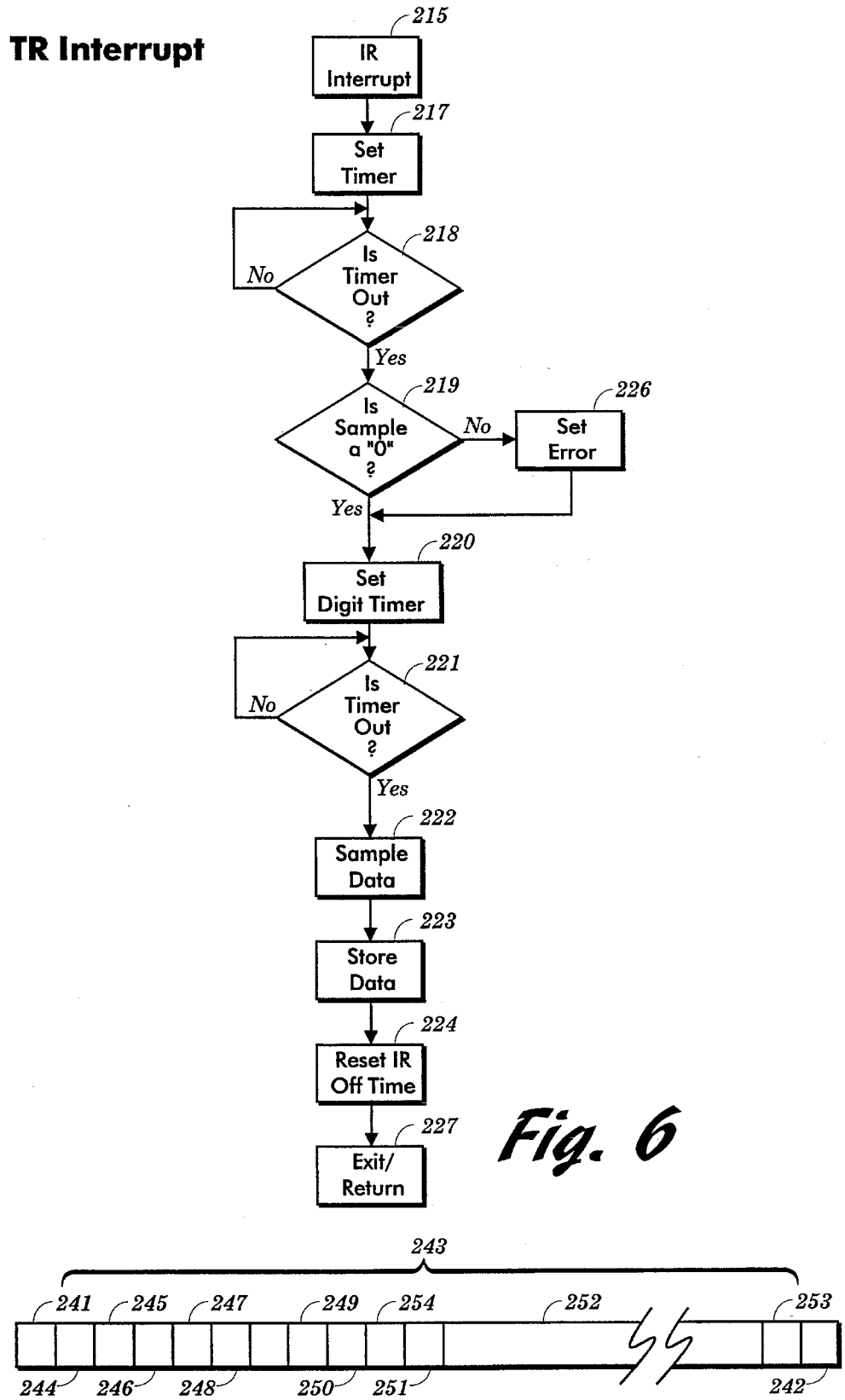
FIG. 6 sets forth a flow diagram of the infrared remote control interrupt operation of the present invention system.

FIG. 6 sets forth a flow diagram of the system operation in the event an infrared remote input interrupt takes place. Beginning at interrupt step 215 in which the interrupt is detected, the interrupt is caused by a determination that an edge is present. With an edge detected, the system sets a timer at step 217 and then moves to a step 218 in which the timer is timed out. Once the timer set has timed out, the system moves to step 219 in which a determination is made as to whether the input is a zero. If no zero input is found, the system sets an error flag at step 226 and then moves to a set digit timer 220. In the event a zero is found at step 219, the system moves directly to step 220 and the zero indicates a valid IR code. In either event, a digit timer is set which is timed out at step 221. Following the timing out at step 221, the system moves to step 222 in which the IR data is sampled and thereafter stored at step 223. Finally, at step 224, the IR off timer is reset and the system returns to the main program at the point of interruption via exit/return step 227.

Figure 7:
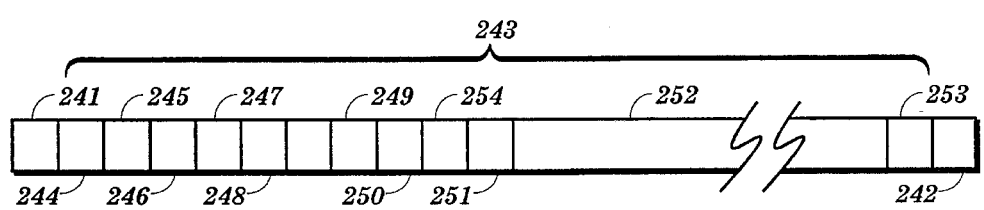
FIG. 7 sets forth a packet structure according to the present invention.

FIG. 7 sets forth a typical data packet used by the present invention system for virtual memory downloading. It should be recalled that each set of records assembled into a record set characterized by having the same type, length and decoder address are formatted by headend 11 into a series of sequentially numbered data packets. It should also be recalled that the record within the initial packet in each series is used to describe the record structure to be used within the records of that series. Thus, in FIG. 7, the diagram shows a typical download packet generally referenced by numeral 240. Download packet 240, in essence, comprises a data packet 243 preceded by a start of packet indicator 241 and followed by an end of packet indicator 242. A protocol indicator 244 identifies the particular download protocol being used. Thereafter, address type 245 provides an identification of the following global or individual address. The term global refers to messages intended for all decoders within a particular distribution group. The address type indicator 245 could be an individual address indication. The use of individual address indicator permits the addressing of messages to a particular decoder using a number code. The global or individual address is 246. An update series indicator 247 is used to define a series of packets which are to be processed to download a particular record set. A sequence number 248 follows update series indicator 247 and indicates the sequential number within the series for each download packet. It should be recalled that when operating on a particular update series, the decoder accepts download packets and processes them in their numbered sequence. Following the sequence number, a record type indicator 249 is used to indicate the type of record which is to follow within the download packet. Record types include standard records, which are to be stored by the processor within the decoder, time records which indicate the changes to be made to maintain proper month, day and time, renumber records, memory allocation, or other types of records. A receive tier 250 provides indication of the authorization required, if any, to receive the download packet. Receive tier 250 also indicates the use or need for decryption within the decoder. A storage location indicator 251 provides information as to whether the particular record is to replace a record or group of records within a record set or, alternatively, indicate that the record may be stored anywhere. Following storage location indicator 251, the new record 252 provides the particular record to be processed by the decoder. This is, in essence, the data portion from the original raw data which began the download process at the headend. A check sum number 253 is provided to permit the system to determine the accuracy and absence of errors within the data packet. The check sum number is derived by calculating the sum of digit values for all prior data bytes within fields 245 through 252. This check sum number is calculated by the download executive at the headend and inserted within field 253 to be transferred within download packet 240. At the decoder, the sum of data bytes within fields 245 through 252 is calculated by the decoder's processor to derive a check sum number which is then compared to the check sum number within field 253 of the download packet. If the check sum numbers do not agree, the packet is discarded and is not processed. Finally, end of packet indicator 242 identifies the termination of data packet 243.

What has been shown is a television distribution system having a downloadable interpretive execution of downloaded data which facilitates a substantial increase in system flexibility and operation. The system shown utilizes an interpretive data execution in which the process presents each downloaded data package to an interpreter and receives a direction from the interpreter to initiate a corresponding instruction set within the dialog processor program. The dialog program is organized into a plurality of instruction sets or sequence groups which are carried forward by the processor and which are free of either loop or branch backward instructions. In addition, the memory 62 housing the dialog program is segregated to provide write protection of downloaded records which assure that the running steps of an instruction set portion or sequence group within the program cannot affect changes of the segregated memory portions. These portions remain changeable by out of band data download, however, to maintain the system flexibility.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method of downloading data within a cable system having a headend and a receiver decoder coupled by an out of band communication link comprising the steps of:

A. receiving to-be-downloaded data in digital form;

B. assembling said to-be-downloaded data into groups of common information types;

C. further assembling the data within each group into a set of records, each record within an individual record set being characterized by having an equal number of bits, and an identical type of information;

D. further formatting the records within the set into a plurality of download packets, each packet having a packet start indicator, a sequence number identifying a serial position in which the packet is to be accepted by the receiver decoder, information within at least one said record, a decoder address, and a packet end indicator, and E. repeatedly broadcasting said plurality of download packets upon said out of band communication link.

2. The method of claim 1 further including the steps of:

receiving said plurality of download packets at said receiver decoder;

examining said address and sequence number; and accepting said download packets having a predetermined address and sequence number.

3. The method of claim 2 wherein said formatting step includes providing each packet with a series number which identifies said plurality of download packets and wherein said examining step includes examining said series number and wherein said accepting step includes acceptance of only a predetermined series number.

4. A method of downloading data within a cable system having a headend and a plurality of receiver decoders coupled to said headend by an out of band communication link comprising the steps of:

receiving data for downloading in digital form;

assembling at least a portion of said data into a record set, the set formed of equal length records having a common record information type and a common decoder address;

formatting said record set into a plurality of download packets; and repeatedly broadcasting said plurality of download packets to said plurality of receiver decoders in a plurality of repeated transmissions upon said out of band communication link.

5. The method of claim 4 wherein said formatting step includes the steps of:

adding a start packet indicator to the beginning of each download packet; and adding an end packet indicator to the end of each download packet.

6. The method of claim 5 wherein said formatting step includes the step of adding a sequence number to each of said download packets to serially number all download packets in a process sequence.

7. The method of claim 6 wherein said formatting step includes the step of adding a common series number to each of said download packets in said plurality of download packets.

8. The method of claim 7 wherein said formatting step includes the step of adding a decoder address to each of said download packets in said plurality of download packets.

9. The method of claim 7 wherein said formatting step includes the step of adding a record type number to each of said download packets in said plurality of download packets.

10. The method of claim 7 wherein said formatting step includes the step of adding a receive tier number to each of said download packets in said plurality of download packets.

11. The method of claim 7 wherein said formatting step includes the step of adding a check sum number to each of said download packets in said plurality of download packets.

12. The method of claim 7 wherein said formatting step includes the step of adding a storage location number to each of said download packets in said plurality of download packets.

13. The method of claim 4 further including the steps of:
receiving said repeatedly broadcast plurality of downloaded packets at one of said receiver decoders;
examining one of said download packets;
accepting or discarding said one of said download packets based upon said examining step; and
repeating said examining and accepting or discarding steps on another one of said download packets.

14. The method of claim 13 wherein said formatting step includes the steps of adding a start packet indicator to the beginning of each download packet and adding an end packet indicator to the end of each download packet and wherein said examining step includes identifying a complete download packet using said start packet indicator and said end packet indicator.

15. The method of claim 14 wherein said formatting step includes the step of adding a sequence number to each of said download packets to number all download packets in a process sequence and wherein said examining step includes determining whether said sequence number corresponds to a next sequence number following a directly preceding download packet accepted.

16. The method of claim 15 wherein said formatting step includes the step of adding a common series number to each of said download packets in said plurality of download packets and wherein said examining step includes determining whether the series number corresponds to the series number of download packets being accepted.

17. A data system for downloading data within a cable system having a headend and a receiver decoder coupled by an out of band communication link, said data system comprising:
means for receiving to-be-downloaded digital data;
means for assembling said to-be-downloaded data into a plurality of record sets in which each record within a single record set is characterized by an equal number of bits, an identical record type and an address;
means for formatting the record set into a plurality of download packets each having a packet start indicator, a sequence number, a record, and a packet end indicator; and
means for repeatedly broadcasting said plurality of download packets upon said out of band communication link.

18. A data system as set forth in claim 17 further:
means for receiving said broadcast plurality of download packets at said receiver decoder;
means for examining said address and sequence number; and
means for accepting ones of said download packets which have a predetermined address and sequence number.

19. A data system as set forth in claim 18 wherein said means for formatting includes means for providing a series number which identifies said plurality of download packets as a common series and wherein said means for examining includes means for examining said series number and wherein said means for accepting responds to a predetermined series number.

20. A data system for downloading data within a cable system having a headend and a plurality of receiver decoders coupled to said headend by an out of band communication link, said data system comprising:
means for receiving digital data for downloading;
means for assembling at least a portion of said data into a record set formed of records having an equal bit length and having a common information type and a common decoder address;
means for formatting said record set into a plurality of download packets; and
means for repeatedly broadcasting said plurality of download packets to said plurality of receiver decoders in a plurality of repeated transmissions upon said out of band communication link.

21. A data system as set forth in claim 20 wherein said means for formatting includes:
means for adding a start packet indicator to the beginning of each download packet; and
means for adding an end packet indicator to the end of each download packet.

22. A data system as set forth in claim 21 wherein said means for formatting includes means for adding a sequence number to each of said download packets to number all download packets in a process sequence.

23. A data system as set forth in claim 22 wherein said means for formatting includes means for adding a common series number to each of said download packets in said plurality of download packets.

24. A data system as set forth in claim 23 wherein said means for formatting includes means for adding a decoder address to each of said download packets in said plurality of download packets.

25. A data system as set forth in claim 23 wherein said means for formatting includes means for adding a record type number to each of said download packets in said plurality of download packets.

26. A data system as set forth in claim 23 wherein said means for formatting includes means for adding a receive tier number to each of said download packets in said plurality of download packets.

27. A data system as set forth in claim 23 wherein said means for formatting includes means for adding a check sum number to each of said download packets in said plurality of download packets.

28. A data system as set forth in claim 23 wherein said means for formatting includes means for adding a storage location number to each of said download packets in said plurality of download packets.

29. A data system as set forth in claim 20 further including:
means for receiving said broadcast plurality of packets;

means for examining one of said download packets;

means for accepting or discarding said one of said download packets based upon said examining step; and means for repeating the operations of said means for examining and means for accepting or discarding on another one of said download packets until all of said download packets have been examined.

30. A data system as set forth in claim 29 wherein said means for formatting includes means for adding a start packet indicator to the beginning of each download packet and adding an end packet indicator to the end of each download packet and wherein said means for examining includes means for identifying a complete download packet using said start packet indicator and said end packet indicator.

31. A data system as set forth in claim 30 wherein said means for formatting includes means for adding a sequence number to each of said download packets to number all download packets in a process sequence and wherein said means for examining includes means for determining whether said sequence number corresponds to a next sequence number following a directly preceding download packet accepted.

32. A data system as set forth in claim 31 wherein said means for formatting includes means for adding a common series number to each of said download packets in said plurality of download packets and wherein said means for examining includes means for determining whether the series number corresponds to the series number of download packets being accepted.

\* \* \* \* \*